(No Model.)
C. A. FAURE & F. KING.
SECONDARY BATTERY.
No. 552,425. Patented Dec. 31, 1895.
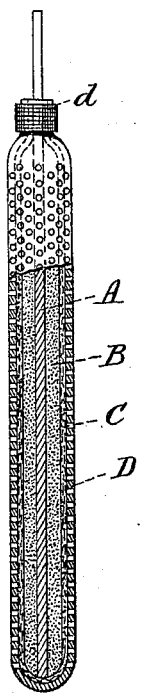
Witnesses
Geo. Lewis.
W. R. Edelen.
Inventors.
Camille A. Faure
and Frank King.
by Pollok Mauro,
their attorneys.

UNITED STATES PATENT OFFICE.

CAMILLE ALPHONSE FAURE, OF PARIS, FRANCE, AND FRANK KING, OF LONDON, ENGLAND.

SECONDARY BATTERY.

SPECIFICATION forming part of Letters Patent No. 552,425, dated December 31, 1895.

Application filed March 6, 1895. Serial No. 540,759. (No model.)

*To all whom it may concern:*

Be it known that we, CAMILLE ALPHONSE FAURE, electrician, a citizen of the French Republic, residing at 37 Avenue de la République, Paris, France, and FRANK KING, engineer, a subject of the Queen of Great Britain and Ireland, residing at 4 Great Winchester Street, in the city of London, England, have invented certain Improvements in Secondary Batteries, of which the following is a specification.

Our invention relates to secondary batteries, and provides means whereby the active material is more effectively retained in position than hitherto, the gradual falling away of the said active material, which is the result of use, being prevented or greatly retarded.

It is well known that the capacity per unit weight of secondary batteries is adversely affected by the very large proportion which the conductor or support bears to the active material.

Our present invention is more particularly applicable to secondary batteries in which a large amount of active material is held up to or against a comparatively light conducting plate or support by some extraneous means, hitherto consisting of a perforated sheet or envelope of celluloid paper, felt, or like acid-resisting non-conducting material in contact with the peroxide of lead; but the said material has gradually disintegrated, and it is this disintegration which it is the object of our invention to obviate, and this we effect by providing the electrode with a duplex retaining cover or envelope, which on the one hand is not injured by the peroxide of lead and on the other hand is not injured by the acid electrolyte of the battery.

According to our invention we take any suitable form of light support, to which the active material (or material to be rendered or to become active) is attached or applied. The plate so constructed is surrounded or covered with a thin sheet or layer of silicated asbestos fabric, (paper or cloth,) which is porous, not oxidizable, and therefore not liable to be injured by the peroxide of lead, and upon or around the plate so covered we place a perforated envelope or cover or sheet or sheets of celluloid, ebonite or other sufficiently acid-resisting non-conducting material, the whole forming an electrode covered with a perforated insulating envelope or cover, the active material being prevented from falling through the perforations of the said envelope or cover by the silicated asbestos, applied as aforesaid, and the said silicated asbestos preventing the perforated cover from coming into contact with the peroxide of lead of the plate.

The accompanying drawing shows in section an electrode made in accordance with our invention.

A is the conducting support; B, the active material; C, the non-conducting porous sheet of silicated asbestos; and D is the perforated envelope or cover of celluloid, ebonite, or the like, which is prevented by the material C from coming into contact with the peroxide of lead of the electrode.

The coverings may be secured in any convenient way. For instance, the envelope or cover D may be cemented or bound in place so that it retains the material C in position. It is shown bound at the top by the asbestos cord $d$, or the like.

By the term "silicated asbestos fabric," as used in this specification, is meant a sheet of asbestos paper or cloth, the fibers of which have been coated with an adherent deposit of silica which protects the binding or agglomerating material used in the manufacture of the asbestos fabric, while still leaving the same porous for passage of the liquid of the battery. This effect may be produced by dipping the fabric in a five per cent. solution in water of silicate of soda, and then drying by exposure to air, whereby, as is well known, the carbonic acid of the air combines with the soda, forming a soluble carbonate, which leaves the fabric when it is placed in the battery, while the silica, which is set free, deposits on the fibers. This operation may be repeated, usually about four times, care being taken, however, to stop short of the point where the deposit of silica would clog the pores of the fabric.

Having now particularly described and ascertained the nature of this invention and in what manner the same is to be performed, we declare that what we claim is—

In a secondary battery, the combination with the conducting support carrying the active material, of a sheet or layer of silicated asbestos fabric, and a perforated envelope or cover of acid-resisting material, such as ebonite or celluloid, which is kept from contact with the active material by the said silicated asbestos, substantially as described.

In testimony whereof we have signed our names to this specification in the presence of two subscribing witnesses.

CAMILLE ALPHONSE FAURE.
    FRANK KING.

Witnesses to the signature of Camille Alphonse Faure:
    DAVID T. S. FULLER,
    D. MANAGNO.

Witnesses to the signature of Frank King:
    J. E. NEWTON,
    F. GOATER.